(12) United States Patent
Hill

(10) Patent No.: US 7,548,322 B2
(45) Date of Patent: *Jun. 16, 2009

(54) MULTI-AXIS INTERFEROMETERS AND METHODS AND SYSTEMS USING MULTI-AXIS INTERFEROMETERS

(75) Inventor: Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/870,523

(22) Filed: Oct. 11, 2007

(65) Prior Publication Data

US 2008/0117428 A1    May 22, 2008

Related U.S. Application Data

(63) Continuation of application No. 11/030,755, filed on Jan. 6, 2005, now Pat. No. 7,283,248.

(60) Provisional application No. 60/564,448, filed on Apr. 22, 2004, provisional application No. 60/535,078, filed on Jan. 7, 2004, provisional application No. 60/534,481, filed on Jan. 6, 2004.

(51) Int. Cl.
*G01B 9/02* (2006.01)

(52) U.S. Cl. ...................... 356/500; 356/514

(58) Field of Classification Search ............. 356/493, 356/498, 487, 486, 500, 510, 489, 495, 514
See application file for complete search history.

(56) References Cited

U.S. PATENT DOCUMENTS

| 4,606,638 A | 8/1986 | Sommargren |
| 4,662,750 A | 5/1987 | Barger |
| 4,711,573 A | 12/1987 | Wijntjes et al. |
| 4,790,651 A | 12/1988 | Brown et al. |
| 4,802,765 A | 2/1989 | Young et al. |
| 4,859,066 A | 8/1989 | Sommargren |
| 4,881,816 A | 11/1989 | Zanoni |
| 4,948,254 A | 8/1990 | Ishida |
| 5,064,289 A | 11/1991 | Bockman |

(Continued)

FOREIGN PATENT DOCUMENTS

JP    7-351078    12/1995

(Continued)

OTHER PUBLICATIONS

Badami et al. "Investigation of NonLinearity in High Accuracy Heterodyne Laser Interferometry." American Society for Precision Engineering, 1997 Proceedings, 16, pp. 153-156, 1997.

(Continued)

*Primary Examiner*—Hwa (Andrew) S Lee
(74) *Attorney, Agent, or Firm*—Fish & Richardson P.C.

(57) ABSTRACT

In general, in one aspect, the invention features an apparatus including a multi-axis interferometer configured to produce at least three output beams each including interferometric information about a distance between the interferometer and a measurement object along a corresponding measurement axis, wherein at least three of the measurement axes are in a common plane, wherein the output beams each include a component that makes a pass to the measurement object along a common beam path.

29 Claims, 7 Drawing Sheets

U.S. PATENT DOCUMENTS

| | | | |
|---|---|---|---|
| 5,114,234 A | 5/1992 | Otsuka et al. | |
| 5,151,749 A | 9/1992 | Tanimoto et al. | |
| 5,187,543 A | 2/1993 | Ebert | |
| 5,191,391 A * | 3/1993 | Tsai | 356/487 |
| 5,331,400 A | 7/1994 | Wilkening et al. | |
| 5,363,196 A | 11/1994 | Cameron | |
| 5,404,222 A | 4/1995 | Lis | |
| 5,408,318 A | 4/1995 | Slater | |
| 5,483,343 A | 1/1996 | Iwamoto et al. | |
| 5,491,550 A | 2/1996 | Dabbs | |
| 5,663,793 A | 9/1997 | de Groot | |
| 5,663,893 A | 9/1997 | Wampler et al. | |
| 5,715,057 A | 2/1998 | Bechstein et al. | |
| 5,724,136 A | 3/1998 | Zanoni | |
| 5,757,160 A | 5/1998 | Kreuzer | |
| 5,757,489 A | 5/1998 | Kawakami | |
| 5,764,361 A | 6/1998 | Kato et al. | |
| 5,764,362 A | 6/1998 | Hill et al. | |
| 5,781,277 A | 7/1998 | Iwamoto | |
| 5,790,253 A | 8/1998 | Kamiya | |
| 5,801,832 A | 9/1998 | Van Der Brink | |
| 5,862,164 A | 1/1999 | Hill | |
| 5,917,844 A | 6/1999 | Hill | |
| 5,951,482 A | 9/1999 | Winston et al. | |
| 5,970,077 A | 10/1999 | Hill | |
| 5,991,033 A * | 11/1999 | Henshaw et al. | 356/487 |
| 6,008,902 A | 12/1999 | Rinn | |
| 6,020,964 A | 2/2000 | Loopstra et al. | |
| 6,040,096 A | 3/2000 | Kakizaki | |
| 6,046,792 A | 4/2000 | Van Der Werf et al. | |
| 6,134,007 A | 10/2000 | Naraki et al. | |
| 6,137,574 A | 10/2000 | Hill | |
| 6,160,619 A | 12/2000 | Magome | |
| 6,181,420 B1 | 1/2001 | Badami et al. | |
| 6,201,609 B1 | 3/2001 | Hill et al. | |
| 6,208,424 B1 | 3/2001 | de Groot | |
| 6,219,144 B1 | 4/2001 | Hill | |
| 6,236,507 B1 | 5/2001 | Hill et al. | |
| 6,246,481 B1 | 6/2001 | Hill | |
| 6,252,668 B1 | 6/2001 | Hill | |
| 6,271,923 B1 | 8/2001 | Hill | |
| 6,304,318 B1 | 10/2001 | Matsumoto | |
| 6,313,918 B1 | 11/2001 | Hill et al. | |
| 6,327,039 B1 | 12/2001 | de Groot et al. | |
| 6,330,065 B1 | 12/2001 | Hill | |
| 6,330,105 B1 | 12/2001 | Rozelle et al. | |
| 6,384,899 B1 | 5/2002 | den Boef | |
| 6,417,927 B2 | 7/2002 | de Groot | |
| 6,496,266 B1 * | 12/2002 | Nishioki | 356/486 |
| 6,541,759 B1 | 4/2003 | Hill | |
| 6,700,665 B2 | 3/2004 | Hill | |
| 6,710,884 B2 | 3/2004 | Hill | |
| 6,738,143 B2 | 5/2004 | Chu | |
| 6,757,066 B2 * | 6/2004 | Hill | 356/493 |
| 6,806,960 B2 | 10/2004 | Bagwell et al. | |
| 6,813,022 B2 | 11/2004 | Inoue | |
| 6,839,142 B2 * | 1/2005 | Isshiki et al. | 356/498 |
| 6,917,432 B2 * | 7/2005 | Hill et al. | 356/520 |
| 2001/0035959 A1 | 11/2001 | Hill | |
| 2002/0001086 A1 | 1/2002 | De Groot | |
| 2002/0048026 A1 | 4/2002 | Isshiki et al. | |
| 2002/0089671 A1 | 7/2002 | Hill | |
| 2003/0035114 A1 | 2/2003 | Hill | |
| 2003/0090675 A1 | 5/2003 | Fujiwara | |
| 2004/0046965 A1 | 3/2004 | Hill | |
| 2005/0237536 A1 | 10/2005 | Hill et al. | |
| 2005/0248772 A1 | 11/2005 | Hill et al. | |

FOREIGN PATENT DOCUMENTS

| | | |
|---|---|---|
| JP | 8-117083 | 4/1996 |
| JP | 9-178415 | 7/1997 |
| JP | 9-280822 | 10/1997 |
| JP | 10-260009 | 9/1998 |
| WO | WO 01/90686 | 11/2001 |
| WO | PCT05/013711 | 11/2005 |

OTHER PUBLICATIONS

Bennett, S.J.. "A Double-Passed Michelson Interferometer." Optics Communications, 4:6, pp. 428-430, 1972.

Bobroff, Norman. "Recent advances in displacement measuring interferometry." Meas. Sci. Technol. 4, pp. 907-926, 1993.

Bobroff, Norman. "Residual errors in laser interferometry from air turbulence and nonlinearity." Applied Optics, 26:13, pp. 2676-2686, 1987.

Hines et al. Sub-Nonometer Laser Metrology—Some Techniques and Models. ESO Conference on High-Resolution Imaging by Interferometry II, pp. 1195-1204, 1991.

Mauer, Paul. "Phase Compensation of Total Internal Reflection." J. Opt. Soc. Am., 56;9, pp. 1219-1221, 1966.

Oka et al. "Polarization heterodyne interferometry using another local oscillator beam." Optics Communications, 92, pp. 1-5, 1992.

Player, M.A. "Polarization properties of a cube-corner reflector." J. Mod. Opt., 35:11, pp. 1813-1820, 1988.

Wu et al. "Analytical modeling of the periodic nonlinearity in heterodyne interferometry." Applied Optics, 37:28, pp. 6696-6700, 1998.

* cited by examiner

MULTI-AXIS INTERFEROMETERS AND METHODS AND SYSTEMS USING MULTI-AXIS INTERFEROMETERS

CROSS-REFERENCE TO RELATED APPLICATIONS

This application is a continuation of U.S. patent application Ser. No. 11/030,755, entitled "MULTI-AXIS INTERFEROMETERS AND METHODS AND SYSTEMS USING MULTI-AXIS INTERFEROMETERS," filed on Jan. 6, 2005, now U.S. Pat. No. 7,283,248, which claims priority under 35 USC § 119 to Provisional Patent Application No. 60/534,481, entitled "MULTI-AXIS INTERFEROMETER FOR MIRROR MAPPING," filed on Jan. 6, 2004, to Provisional Patent Application No. 60/535,078, entitled "MULTI-AXIS INTERFEROMETER FOR MIRROR MAPPING," filed on Jan. 7, 2004, and to Provisional Patent Application No. 60/564,448, entitled "MULTI-AXIS INTERFEROMETER AND DATA PROCESSING FOR MIRROR MAPPING," filed on Apr. 22, 2004. The entire contents of Provisional Patent Application Nos. 60/534,481, 60/535,078, and 60/564,448 and U.S. patent application Ser. No. 11/030,755 are hereby incorporated by reference.

BACKGROUND

This invention relates to interferometers, and systems and methods that use interferometers.

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam-splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams.

A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where v is the relative speed of the measurement and reference objects, $\lambda$ is the wavelength of the measurement and reference beams, n is the refractive index of the medium through which the light beams travel, e.g., air or vacuum, and p is the number of passes to the reference and measurement objects. Changes in the phase of the measured interference signal correspond to changes in the relative position of the measurement object, e.g., a change in phase of $2\pi$ corresponds substantially to a distance change L of $\lambda/(2np)$. Distance 2L is a round-trip distance change or the change in distance to and from a stage that includes the measurement object. In other words, the phase $\Phi$, ideally, is directly proportional to L, and can be expressed as $$\Phi = 2pkL, \quad (1)$$

$$\text{where } k = \frac{2\pi n}{\lambda}.$$

Unfortunately, the observable interference phase, $\tilde{\Phi}$, is not always identically equal to phase $\Phi$. Many interferometers include, for example, non-linearities such as those known as "cyclic errors." The cyclic errors can be expressed as contributions to the observable phase and/or the intensity of the measured interference signal and have a sinusoidal dependence on the change in for example optical path length 2pnL. In particular, a first order cyclic error in phase has for the example a sinusoidal dependence on $(4\pi pnL)/\lambda$ and a second order cyclic error in phase has for the example a sinusoidal dependence on $2(4\pi pnL)/\lambda$. Higher order cyclic errors can also be present as well as sub-harmonic cyclic errors and cyclic errors that have a sinusoidal dependence of other phase parameters of an interferometer system comprising detectors and signal processing electronics. Different techniques for quantifying such cyclic errors are described in commonly owned U.S. Pat. Nos. 6,137,574, 6,252,688, and 6,246,481 by Henry A. Hill.

There are in addition to the cyclic errors, non-cyclic non-linearities or non-cyclic errors. One example of a source of a non-cyclic error is the diffraction of optical beams in the measurement paths of an interferometer. Non-cyclic error due to diffraction has been determined for example by analysis of the behavior of a system such as found in the work of J.-P. Monchalin, M. J. Kelly, J. E. Thomas, N. A. Kurnit, A. Szöke, F. Zernike, P. H. Lee, and A. Javan, "Accurate Laser Wavelength Measurement With A Precision Two-Beam Scanning Michelson Interferometer," *Applied Optics*, 20(5), 736-757, 1981.

A second source of non-cyclic errors is the effect of "beam shearing" of optical beams across interferometer elements and the lateral shearing of reference and measurement beams one with respect to the other. Beam shears can be caused, for example, by a change in direction of propagation of the input beam to an interferometer or a change in orientation of the object mirror in a double pass plane mirror interferometer such as a differential plane mirror interferometer (DPMI) or a high stability plane mirror interferometer (HSPMI).

Inhomogeneities in the interferometer optics may cause wavefront errors in the reference and measurement beams. When the reference and measurement beams propagate collinearly with one another through such inhomogeneities, the resulting wavefront errors are identical and their contributions to the interferometric signal cancel each other out. More typically, however, the reference and measurement beam components of the output beam are laterally displaced from one another, i.e., they have a relative beam shear. Such beam shear causes the wavefront errors to contribute an error to the interferometric signal derived from the output beam.

Moreover, in many interferometry systems beam shear changes as the position or angular orientation of the measurement object changes. For example, a change in relative beam shear can be introduced by a change in the angular orientation of a plane mirror measurement object. Accordingly, a change in the angular orientation of the measurement object produces a corresponding error in the interferometric signal.

The effect of the beam shear and wavefront errors will depend upon procedures used to mix components of the output beam with respect to component polarization states and to detect the mixed output beam to generate an electrical interference signal. The mixed output beam may for example be detected by a detector without any focusing of the mixed beam onto the detector, by detecting the mixed output beam as a beam focused onto a detector, or by launching the mixed output beam into a single mode or multi-mode optical fiber and detecting a portion of the mixed output beam that is transmitted by the optical fiber. The effect of the beam shear and wavefront errors will also depend on properties of a beam stop should a beam stop be used in the procedure to detect the mixed output beam. Generally, the errors in the interferometric signal are compounded when an optical fiber is used to transmit the mixed output beam to the detector.

Amplitude variability of the measured interference signal can be the net result of a number of mechanisms. One mechanism is a relative beam shear of the reference and measurement components of the output beam that is for example a consequence of a change in orientation of the measurement object.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used in converting the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged.

The interferometers described above are often components of metrology systems in scanners and steppers used in lithography to produce integrated circuits on semiconductor wafers. Such lithography systems typically include a translatable stage to support and fix the wafer, focusing optics used to direct a radiation beam onto the wafer, a scanner or stepper system for translating the stage relative to the exposure beam, and one or more interferometers. Each interferometer directs a measurement beam to, and receives a reflected measurement beam from, a plane mirror attached to the stage. Each interferometer interferes its reflected measurement beams with a corresponding reference beam, and collectively the interferometers accurately measure changes in the position of the stage relative to the radiation beam. The interferometers enable the lithography system to precisely control which regions of the wafer are exposed to the radiation beam.

In many lithography systems and other applications, the measurement object includes one or more plane mirrors to reflect the measurement beam from each interferometer. Small changes in the angular orientation of the measurement object, e.g., corresponding to changes in the pitching and/or yaw of a stage, can alter the direction of each measurement beam reflected from the plane mirrors. If left uncompensated, the altered measurement beams reduce the overlap of the exit measurement and reference beams in each corresponding interferometer. Furthermore, these exit measurement and reference beams will not be propagating parallel to one another nor will their wave fronts be aligned when forming the mixed beam. As a result, the interference between the exit measurement and reference beams will vary across the transverse profile of the mixed beam, thereby corrupting the interference information encoded in the optical intensity measured by the detector.

To address this problem, many conventional interferometers include a retroreflector that redirects the measurement beam back to the plane mirror so that the measurement beam "double passes" the path between the interferometer and the measurement object. The presence of the retroreflector insures that the direction of the exit measurement is insensitive to changes in the angular orientation of the measurement object. When implemented in a plane mirror interferometer, the configuration results in what is commonly referred to as a high-stability plane mirror interferometer (HSPMI). However, even with the retroreflector, the lateral position of the exit measurement beam remains sensitive to changes in the angular orientation of the measurement object. Furthermore, the path of the measurement beam through optics within the interferometer also remains sensitive to changes in the angular orientation of the measurement object.

In practice, the interferometry systems are used to measure the position of the wafer stage along multiple measurement axes. For example, defining a Cartesian coordinate system in which the wafer stage lies in the x-y plane, measurements are typically made of the x and y positions of the stage as well as the angular orientation of the stage with respect to the z axis, as the wafer stage is translated along the x-y plane. Furthermore, it may be desirable to also monitor tilts of the wafer stage out of the x-y plane. For example, accurate characterization of such tilts may be necessary to calculate Abbé offset errors in the x and y positions. Thus, depending on the desired application, there may be up to five degrees of freedom to be measured. Moreover, in some applications, it is desirable to also monitor the position of the stage with respect to the z-axis, resulting in a sixth degree of freedom.

To measure each degree of freedom, an interferometer is used to monitor distance changes along a corresponding metrology axis. For example, in systems that measure the x and y positions of the stage as well as the angular orientation of the stage with respect to the x, y, and z axes, at least three spatially separated measurement beams reflect from one side of the wafer stage and at least two spatially separated measurement beams reflect from another side of the wafer stage. See, e.g., U.S. Pat. No. 5,801,832 entitled "METHOD OF AND DEVICE FOR REPETITIVELY IMAGING A MASK PATTERN ON A SUBSTRATE USING FIVE MEASURING AXES," the contents of which are incorporated herein by reference. Each measurement beam is recombined with a reference beam to monitor optical path length changes along the corresponding metrology axes. Because the different measurement beams contact the wafer stage at different locations, the angular orientation of the wafer stage can then be derived from appropriate combinations of the optical path length measurements. Accordingly, for each degree of freedom to be monitored, the system includes at least one measurement beam that contacts the wafer stage. Furthermore, as described above, each measurement beam may double-pass the wafer stage to prevent changes in the angular orientation of the wafer stage from corrupting the interferometric signal. The measurement beams may be generated from physically separate interferometers or from multi-axes interferometers that generate multiple measurement beams.

Surface variations due to imperfections in a plane mirror measurement object of an interferometry system introduce errors in displacement and angle measurements made using the interferometry system. The effect of these errors may be amplified when determining the location of a mark located away from the interferometer's measurement axis. However, the effect of these errors on off-axis measurements can be reduced or eliminated if the profile of the mirror surface is known.

Interferometry systems that utilize two interferometers to monitor a plane mirror measurement object along two parallel measurement axes can be used to map the mirror surface profile along a scan line. This is achieved by monitoring the displacement of the mirror surface relative to a reference point on each of the two measurement axes while scanning the mirror in a direction orthogonal to the measurement axes. Provided the stage on which the mirror is mounted does not rotate with respect the interferometers, or where any stage rotation is independently monitored and accounted for, the difference between the displacement measurements provides a measure of the average slope of the mirror surface between the two measurement axes. Furthermore, integrating the slope over the scan line provides a measure of the departure of the mirror surface from a perfectly planar surface (also referred to as mirror "unevenness").

SUMMARY

In general, in a first aspect, the invention features an apparatus including a multi-axis interferometer configured to produce at least three output beams each including interferometric information about a distance between the interferometer and a measurement object along a corresponding measurement axis, wherein at least three of the measurement axes are in a common plane, wherein the output beams each include a component that makes a pass to the measurement object along a common beam path.

In general, in another aspect, the invention features an apparatus including a multi-axis interferometer configured to produce at least three output beams each including interferometric information about a distance between the interferometer and a measurement object along a corresponding measurement axis, and an electronic processing system coupled to the multi-axis interferometer, wherein the electronic processing system is configured to calculate a value for a second difference parameter (SDP) for the measurement object based on the distances between the interferometer and the measurement object along the at least three measurement axes.

In general, in another aspect, the invention features an apparatus including a multi-axis interferometer configured to produce at least three output beams each including interferometric information about a distance between the interferometer and a measurement object along a corresponding measurement axis, wherein the output beams each include a component that makes one pass to the measurement object along a common measurement beam path, and an electronic processor configured to derive information about the surface figure profile of the measurement object from the output beams as the measurement object is scanned relative to the interferometry system along a distance non-parallel to the measurement axes.

In general, in another aspect, the invention features an apparatus including a multi-axis interferometer configured to produce at least three output beams each including interferometric information about a distance between the interferometer and a measurement object along a corresponding measurement axis, and an electronic processing system coupled to the multi-axis interferometer, wherein the electronic processing system is configured to calculate a value for an expression related to a second spatial derivative of a surface figure profile of the measurement object (e.g., a SDP) based on the distances between the interferometer and the measurement object along the at least three measurement axes.

In general, in a further aspect, the invention features a method that includes producing at least three output beams each including interferometric information about a distance between the interferometer and a measurement object along a corresponding measurement axis, and calculating a value for a second difference parameter (SDP) for the measurement object based on the distances between the interferometer and the measurement object along the at least three measurement axes.

In general, in another aspect, the invention features a method that includes producing at least three output beams each including interferometric information about a distance between the interferometer and a measurement object along a corresponding measurement axis, wherein the output beams each include a component that makes one pass to the measurement object along a common measurement beam path, and deriving information about the surface figure profile of the measurement object from the output beams as the measurement object is scanned relative to the interferometry system along a distance non-parallel to the measurement axes.

Embodiments of the apparatus and/or methods can include one or more of the following features.

The at least three measurement axes can be parallel. The at least three measurement axes can be in a common plane. The at least three output beams can each include a component that makes one pass to the measurement object along a common measurement beam path. The apparatus can further include an electronic processing system coupled to the multi-axis interferometer, wherein the electronic processing system is configured to calculate a value for a second difference parameter (SDP) for the measurement object based on distance between the interferometer and the measurement object along the three measurement axes. The SDP can be given by the expression $(x_2-x_1)-\eta(x_3-x_2)$, where $x_i$ corresponds to the distance between the interferometry system and the measurement object for the $i^{th}$ measurement axis and $\eta$ is a non-zero constant. $\eta$ can be selected so that the value for the expression is not sensitive to second order to rotation of the measurement object about an axis orthogonal to the common plane. The electronic processor can be configured to calculate a value for the SDP for each of multiple positions of the measurement object relative to the interferometer along an axis orthogonal to the measurement axes and determine information about a surface figure for the measurement object based on the multiple values. The electronic processor can be configured to monitor a position of the measurement object based on at least some of the interferometric information from the at least three output beams. The electronic processor can be further configured to use the information about the surface figure to improve the accuracy the monitored position.

The multi-axis interferometer can be further configured to produce one or more additional output beams each including interferometric information about a distance between the interferometer and the measurement object along a corresponding measurement axis, wherein the measurement axes corresponding to the additional output beams are not coplanar with the at least three measurement axes. The measurement axes corresponding to the additional output beams can be parallel to the at least three measurement axes.

The apparatus can further include a microlithography tool configured to expose a substrate with radiation passing through a mask, wherein the multi-axis interferometer is configured to provide information about a position of the substrate within the microlithography tool. The measurement object can be mechanically coupled to a wafer stage configured to support the wafer. Alternatively, the multi-axis interferometer can be mechanically coupled to a wafer stage configured to support the wafer and the measurement object is mechanically coupled to a rigid frame of the microlithography tool.

The apparatus can further include a microlithography tool configured to expose a substrate with radiation passing through a mask, wherein the multi-axis interferometer is configured to provide information about a position of the mask within the microlithography tool. The measurement object can be mechanically coupled to a mask stage configured to support the mask. Alternatively, the multi-axis interferometer can be mechanically coupled to a wafer stage configured to support the wafer and the measurement object is mechanically coupled to a rigid frame of the microlithography tool.

The multi-axis interferometer can be configured to direct at least three beams to contact the measurement object at least once and combine each beam with another beam to produce the output beams. The apparatus can further include an electronic processor that derives information about the surface profile of the measurement object from the output beams as the measurement object is scanned relative to the multi-axis interferometer along a distance nonparallel to the measurement axes. The distance over which the measurement object is scanned can be orthogonal to the measurement axes.

In embodiments where measurement object is scanned relative to the interferometry system, the distance over which the measurement object is scanned can be orthogonal to the measurement axes.

Embodiments of the invention can include one or more of the following advantages.

Embodiments of the invention include interferometry assemblies that can be used to monitor the surface figure of a plane mirror measurement object while the measurement object is being scanned relative to an interferometer assembly. Accordingly, where the interferometry system forms part of a metrology system in a lithography tool, the interferometry system can provide in situ measurements of measurement objects used by the metrology system which can reduce tool downtime needed in order to calibrate the metrology system.

Embodiments of the invention can be used to measure values of a parameter related to a surface figure of a plane mirror measurement object. In certain embodiments, this parameter is a SDP. In embodiments where the plane mirror measurement object is part of a metrology system in a lithography tool, the SDP can be measured while a wafer is being processed. Accordingly, information about the surface figure of the mirror can be obtained during wafer processing. This can reduce the time required to maintain the lithography tool, thereby increasing the tool's throughput.

Beams and/or axes referred to as being parallel or nominally parallel may deviate from being perfectly parallel to the extent that the effect of the deviation on a measurement is negligible (e.g., less than the required measurement accuracy by about an order of magnitude or more) or otherwise compensated.

Beams and/or axes referred to as being coplanar or nominally coplanar may deviate from being perfectly coplanar to the extent that the effect of the deviation on a measurement is negligible (e.g., less than the required measurement accuracy by about an order of magnitude or more) or otherwise compensated.

Beams and/or axes referred to as being orthogonal or nominally orthogonal may deviate from being perfectly orthogonal to the extent that the effect of the deviation on a measurement is negligible (e.g., less than the required measurement accuracy by about an order of magnitude or more) or otherwise compensated.

Unless otherwise defined, all technical and scientific terms used herein have the same meaning as commonly understood by one of ordinary skill in the art to which this invention belongs.

Other features and advantages of the invention will be apparent from the following detailed description.

BRIEF DESCRIPTION OF THE DRAWINGS

Like reference symbols in the various drawings indicate like elements.

DETAILED DESCRIPTION

Figure 1A:
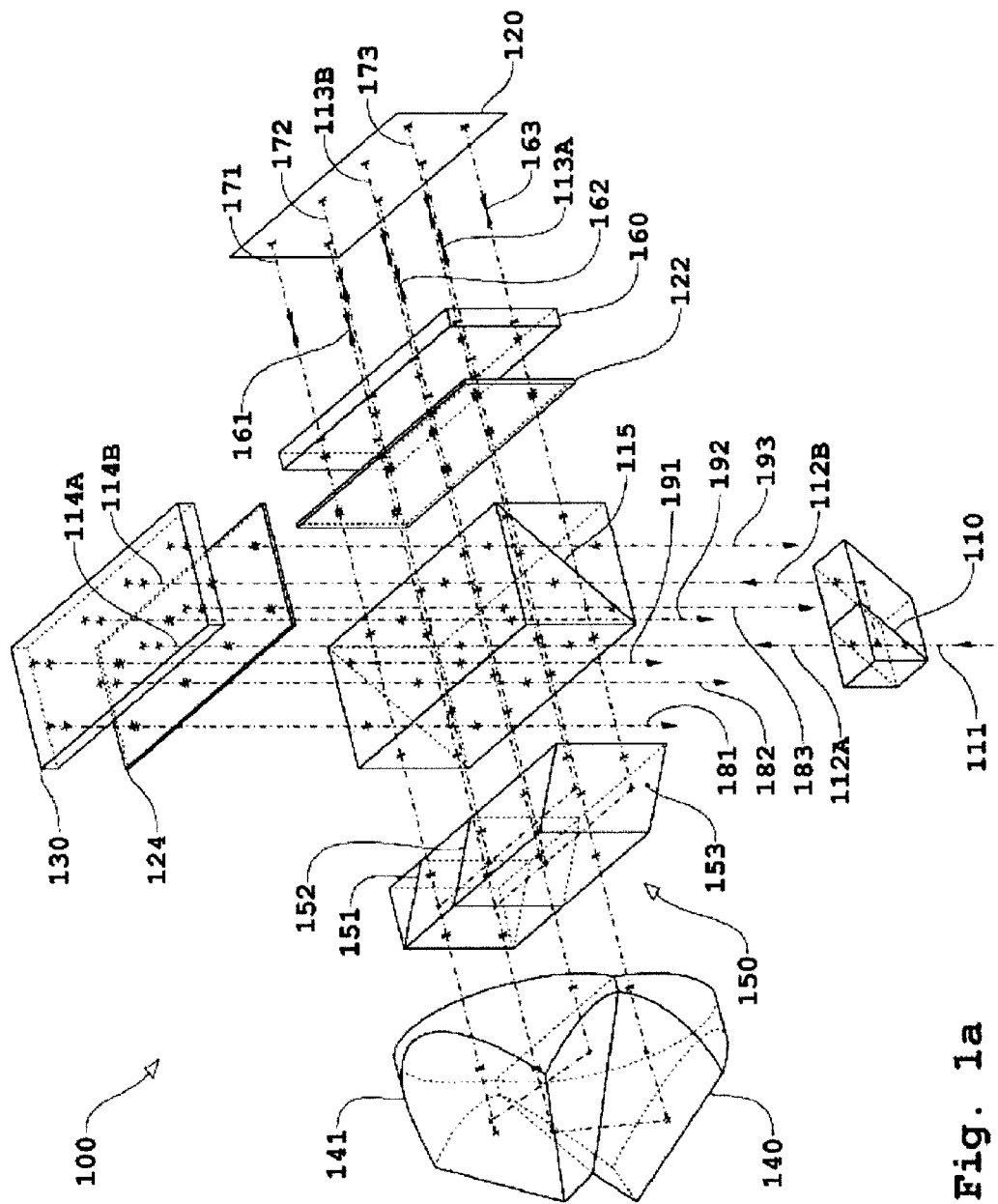
FIG. 1a is a perspective drawing of an interferometer system comprising two 3 axis/plane interferometers.

Errors in interferometric metrology systems that use plane mirror measurement objects can be reduced where a surface figure of mirrors used in the system are known. Knowledge of the surface figures allows one to compensate for variations in the surface figure from an ideal mirror. However, the surface figure of metrology system mirrors can vary with time, so metrology system accuracy can degrade over the system's lifetime. Accordingly, the surface figures of the mirrors used in a metrology system should be remeasured periodically to maintain system accuracy.

Accurate knowledge of the surface figure of a plane mirror measurement object can be particularly beneficial where metrology systems are used in applications with high accuracy requirements. An example of such an application is in lithography tools where metrology systems are used to monitor the position of stages that support a wafer or a mask within the tool. In some embodiments, ex situ measurement methods can be used to determine information about the surface figure of a mirror. In these methods, the mirror is removed from the lithography tool and measured using another piece of apparatus. However, the metrology system cannot be used until the mirror is replaced, so the tool is generally unproductive during such maintenance. Furthermore, the surface figure of a mirror can change when the tool is reinserted into the tool (e.g., as a result of stresses associated with the mechanical attachment of the mirror to the tool), introducing unaccounted sources of error into the metrology system. In situ measurement methods can mitigate these errors because the surface figure is measured while it is attached to the tool, after the mirror has adapted to stresses associated with its attachment to the tool. Moreover, in situ methods can improve tool throughput by reducing the amount of time a tool is offline for servicing.

In this application, interferometry systems are disclosed in which information about a surface figure of a mirror can be obtained in a lithography tool during the operation of the tool. More generally, the systems and methods are not limited to use in lithography tools, and can be used in other applications as well (e.g., in beam writing systems). In certain embodiments, a procedure for measuring and monitoring surface figures of stage mirrors in situ is based, in part, on the measurement of a second difference parameter (SDP) for each mirror. The lowest order term in a series representation of the SDP is related to the second spatial derivative of a functional representation of the surface figure (e.g., corresponding to the second order term of a Taylor series representation of a surface figure function). Accordingly, for relatively large spatial wavelengths, the SDP is substantially equal to the second derivative of the mirror surface figure. Generally, the SDP is determined for a line intersecting a mirror in a plane determined by the orientation of an interferometry assembly with respect to the stage mirror.

Additionally, or alternatively, to measuring values of the SDP in situ as a parallel operation with the normal processing cycle of wafers in the lithography tool, values of the SDP can be measured serially with the wafer processing cycle during, for example, a programmed maintenance procedure of a lithography tool. Here, values of the SDP are also determined in situ.

Measurements of SDP can be made using a multi-axis/plane interferometer. FIG. 1a shows an embodiment of a multi-axis plane mirror interferometer 100, which directs multiple measurement beams to each contact a measurement object 120 (e.g., a plane mirror measurement object) twice. Interferometer 100 produces multiple output beams 181-183 and 191-193 each including interferometric information about changes in distance between the interferometry system and the measurement object along a corresponding measurement axis.

Interferometer 100 has the property that the output beams each includes a measurement component that makes one pass to the measurement object along one of two common measurement beam paths before being directed along separate measurement beam paths for the second pass to the measurement object. Similar interferometers are disclosed in commonly owned U.S. patent application Ser. No. 10/351,707 by Henry, A. Hill filed Jan. 27, 2003 and entitled "MULTIPLE DEGREE OF FREEDOM INTERFEROMETER," the contents of which are incorporated herein by reference.

Interferometer 100 includes a non-polarizing beam splitter 110, which splits a primary input beam 111 into two secondary input beams 112A and 112B. Interferometer 100 also includes a polarizing beam splitter 115, which splits secondary input beams 112A and 112B into primary measurement beams 113A and 113B, and primary reference beams 114A and 114B, respectively. Interferometer 100 directs primary measurement beams 113A and 113B along paths that contact measurement object 120 at different locations in a vertical direction. Similarly, primary reference beams 114A and 114B are directed along reference beam paths that contact a reference mirror 130 at different locations. Interferometer 100 also includes quarter wave plates 122 and 124. Quarter wave plate 122 is located between polarizing beam splitter 115 and measurement object 120, while quarter wave plate 124 is located between polarizing beam splitter 115 and the reference mirror. The quarter wave plates rotate by 90° the polarization state of double passed beams directed between the polarizing beam splitter and the measurement object or reference mirror. Accordingly, the polarizing beam splitter transmits an incoming beam that would have been reflected in its out-going polarization state.

The following description pertains to primary measurement beam 113A and primary reference beam 114A. Interferometer 100 directs measurement beam 113B and reference beam 114B along analogous paths. Polarizing beam splitter (PBS) 115 transmits reflected primary measurement beam 113B, which is reflected back towards PBS 115 by a retroreflector 140 (a similar retroreflector 141 reflects primary measurement beam 113B). A compound optical component 150 including non-polarizing beam splitters 151 and 152 and reflector 153 split primary measurement beam 113A into three secondary measurement beams 161, 162, and 163. PBS 115 transmits the three secondary measurement beams, which propagate along paths that contact measurement object 120 at three different positions in a horizontal plane shared by primary measurement beam 113A. PBS 115 then directs the three secondary measurement beams reflected from measurement object 120 along output paths.

PBS 115 reflects primary reference beam 114A towards retroreflector 140. As for the primary measurement beam, optical component 150 splits primary reference beam 114A reflected by retroreflector 140 into three secondary reference beams 171, 172, and 173. PBS 115 reflects secondary reference beams 171, 172, and 173 towards reference mirror 130 along paths at three different positions in a plane shared by primary reference beam 114A. PBS 115 transmits secondary reference beams 171, 172, and 173 reflected from reference object 130 along output paths so that they overlap with measurement beams 161, 162, and 163 to form output beams 181, 182, and 183, respectively. The phase of the output beams carries information about the position of the measurement object along three measurement axes defined by the primary measurement beam's path and the secondary measurement beams' paths.

Interferometer 100 also includes a window 160 located between quarter wave plate 122 and measurement object 120.

Figure 1B:
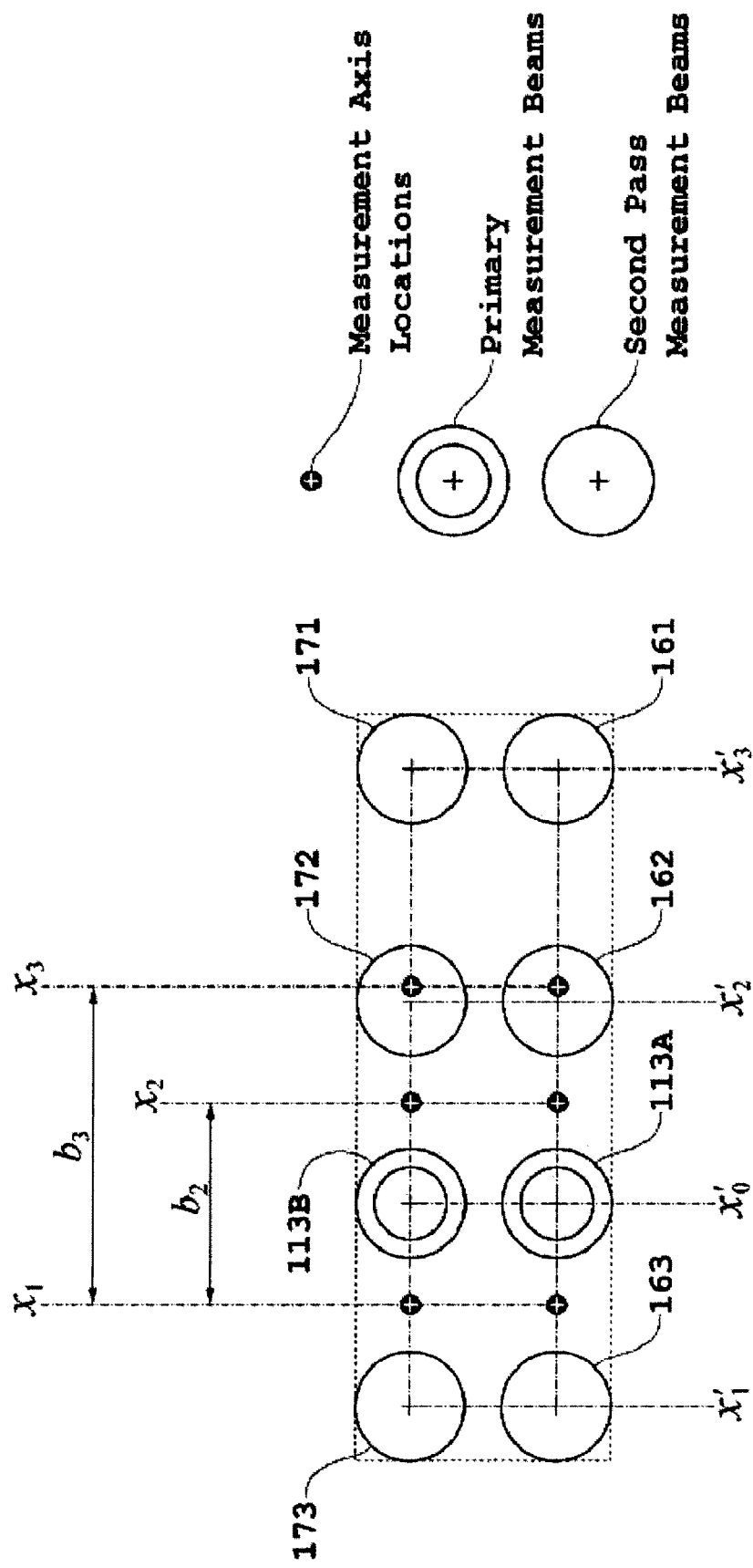
FIG. 1b is a diagram that shows the pattern of measurement beams from interferometer system of FIG. 1a at a stage mirror that serves as measurement object for interferometers of the interferometer system.

The pattern of measurement beams incident on a plane mirror measurement object is shown in FIG. 1b. The angle of incidence of measurement beams at the mirror surface is nominally zero when the measurement axes are parallel to the x-axis of a coordinate system. The locations of the measurement axes of the top multiple-axis/plane interferometer corresponding to $x_1$, $x_2$, and $x_3$ are shown in FIG. 1b. The spacings between measurement axes corresponding to $x_1$ and $x_2$ and to $x_1$ and $x_3$ are $b_2$ and $b_3$, respectively. In general, $b_2$ and $b_3$ can vary as desired. $b_2$ can be the same as or different from $(b_3-b_2)$. In some embodiments, the axis spacing can be relatively narrow (e.g., about 10 cm or less, about 5 cm or less, about 3 cm or less, about 2 cm or less). For example, where the resolution of a measurement depends on the spacing the axes, having relatively narrow spacing between at least two of the measurement axes can provide increased resolution in a measurement.

Also shown in FIG. 1b is the location corresponding to the primary single pass measurement beam $x_0'$ and the locations corresponding to the second pass measurement beams $x_1'$, $x_2'$, and $x_3'$. The relationship between a linear displacement measurement corresponding to a double pass to the stage mirror and the linear displacement measurements corresponding to a single pass to the stage mirror is given by $$x_j = \frac{1}{2}(x'_j + x'_0), \ j = 1, 2, \text{ and } 3. \quad (2)$$

The difference between two linear displacements $x_i$ and $x_j$, $i \neq j$, is independent of $x_0'$, i.e., $$x_i - x_j = \frac{1}{2}(x'_i - x'_j), \ i, j = 1, 2, \text{ and } 3, \ i \neq j. \quad (3)$$

The second difference parameter (SDP) is defined for a 3 axis/plane interferometer such that it is not sensitive to either a displacement of a respective mirror or to the rotation of the mirror except through a third and/or higher order effect involving the angle of stage rotation in a plane defined by the 3 axis/plane interferometer and departures of the stage mirror surface from a plane. Different combinations of displacement measurements $x_1$, $x_2$, and $x_3$ may be used in the definition of a SDP. One definition of a SDP for an x-axis stage mirror is for example $$SDP(y) \equiv (x_2 - x_1) - \frac{b_2}{b_3 - b_2}(x_3 - x_2) \quad (4)$$

or $$SDP(y) = (x_2 - x_1) - \eta(x_3 - x_2) \quad (5)$$

where $$\eta \equiv \frac{b_2}{b_3 - b_2}. \quad (6)$$

Note that SDP can be written in terms of single pass displacements using Equation (3), i.e., $$SDP(y) = \frac{1}{2}[(x'_2 - x'_1) - \eta(x'_3 - x'_2)]. \quad (7)$$

Corresponding equations apply for a y-axis stage mirror.

Certain properties of the 3 axis/plane interferometer relevant to measurement of values of SDP are apparent. For example, as discussed previously, SDP is independent of a displacement of the mirror for which SDP is being measured. Furthermore, SDP is generally independent of a rotation of the mirror for which SDP is being measured except through a third order or higher effects. SDP should be independent of properties of the primary single pass measurement beam path $x_0'$ in the 3 axis/plane interferometer. SDP should be independent of properties of the retroreflector in the 3 axis/plane interferometer. Furthermore, SDP should be independent of changes in the average temperature of the 3 axis/plane interferometer and should be independent of linear temperature gradients in the 3 axis/plane interferometer. SDP should be independent of linear spatial gradients in the refractive indices of certain components in a 3 axis/plane interferometer. SDP should be independent of linear spatial gradients in the refractive indices and/or thickness of cements between components in a 3 axis/plane interferometer. SDP should also be independent of "prism effects" introduced in the manufacture of components of a 3 axes/plane interferometer used to measure the SDP.

Figure 2:
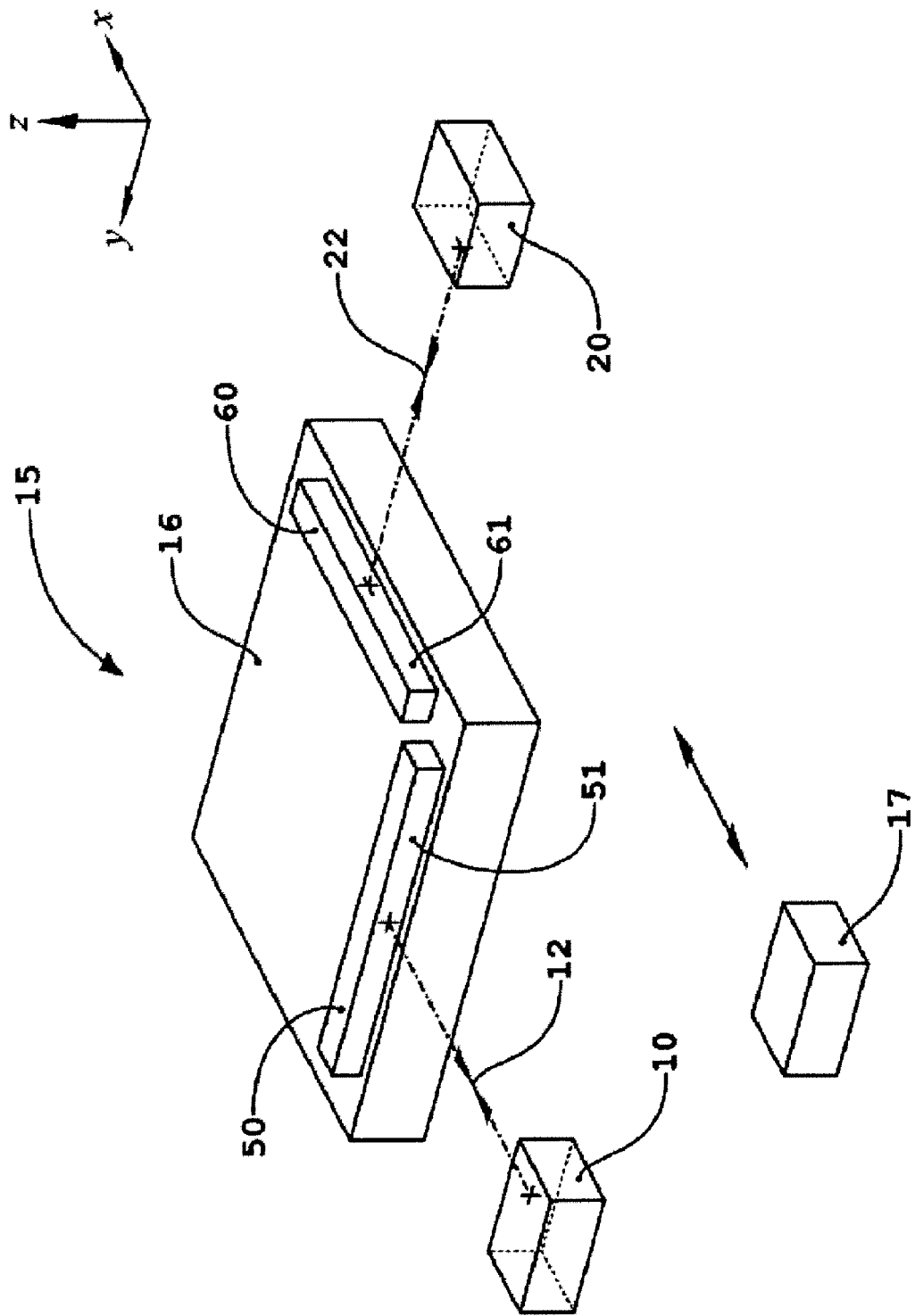
FIG. 2 is a diagrammatic perspective view of an interferometer system.

Reference is made to FIG. 2 which is a diagrammatic perspective view of an interferometry system 15 that employs a pair of orthogonally arranged interferometers or interferometer subsystems by which the shape of on-stage mounted stage mirrors may be characterized in situ along one or more datum lines. As shown in FIG. 2, system 15 includes a stage 16 that forms part of a microlithography tool for fabricating semiconductor products such as integrated circuits, chips, or flat panel displays. Affixed to stage 16 is a plane stage mirror 50 having a y-z reflective surface 51 elongated in the y-direction.

Also, fixedly mounted to stage 16 is another plane stage mirror 60 having an x-z reflective surface 61 elongated in the x-direction. Mirrors 50 and 60 are mounted on stage 16 so that their reflective surfaces, 51 and 61, respectively, are nominally orthogonal to one another. Stage 16 is otherwise mounted for nominally plane translation but may experience small angular rotations about the x, y, and z axes due to, e.g., bearing and drive mechanism tolerances. In normal operation, system 15 is adapted to be operated for scanning in the y-direction for set values of x.

Fixedly mounted off-stage is an interferometer (or interferometer subsystem) that is generally indicated at 10. The purpose of interferometer 10 generally is to measure the SDP of reflecting surface 51 and to measure the position of stage 16 in the x-direction and the angular rotations of stage 16 about the y- and z-axes as stage 16 translates in the y-direction. Interferometer 10 includes two 3 axis/plane interferometers such as interferometer 100 shown in FIG. 1a and arranged so that interferometric beams travel to and from mirror 50 generally along an optical path designated as 12.

Also fixedly mounted off-stage is an interferometer (or interferometer subsystem) that is generally indicated at 20. The purpose of interferometer 20 generally is to measure the SDP of reflecting surface 61 and to measure the position of stage 16 in the y-direction and the angular rotations of stage 16 about the x- and z-axes as stage 16 translates in the x-direction. Interferometer 20 includes two 3 axis/plane interferometers such as interferometer 100 shown in FIG. 1a and arranged so that interferometric beams travel to and from mirror 60 generally along an optical path designated as 22.

Values for the SDP for x-axis stage mirror 50 are measured as a function of position of the mirror in the y-direction with the corresponding x-axis location and the stage mirror orientation nominally held at fixed values. In addition, values for the SDP for y-axis stage mirror 60 are measured as a function of position in the x-direction of the y-axis stage mirror with the corresponding y-axis location and stage orientation nominally held at fixed values.

The orientation of the stage can be determined initially from information obtained using one or both of the 3 axis/plane interferometers. However, the stage orientation does not need to be monitored for the measurements of values for the respective SDP for the x-axis and y-axis stage mirrors during the respective scanning of the stage mirrors since SDP is independent of stage mirror orientation except for third order effects.

In some embodiments, information about the surface figure of a stage mirror can be determined from the SDP corresponding to that mirror. For example, information about the surface figure for the x-axis stage mirror can be determined from SDP(y) acquired for that mirror. As discussed previously, for components of the surface figure that have spatial variations on the order of the separation of measurement axes (e.g., $b_2$ and/or $b_3$) or greater, the SDP corresponds to the second spatial derivative of the mirror's surface figure along the line traced by the interferometer axes during the scan.

Accordingly, a representation of the surface figure, ξ(y), can be determined by integrating SDP(y) over the scanned range. Mathematically, ξ(y) can be expressed as:

$$\xi(y) = \int_L dy \int_L dy\, SDP(y), \tag{8}$$

where L is the range along the y-axis over which the SDP is measured. The constants of integration are associated with a displacement and a fixed angular orientation of the mirror surface in the x-y plane which are not generally relevant to a representation of the surface figure error function.

The surface figure error function for the x-axis stage mirror will, in general, be a function of both y and z and the surface figure error function for the y-axis stage mirror will in general be a function of both x and z. The generalization to cover the z dependent properties is subsequently addressed by the use to two 3 axes/plane interferometer system in conjunction with a procedure to measure the angle between the x-axis and y-axis stage mirrors in two different parallel planes corresponding to the two planes defined by the two 3 axes/plane interferometer system.

As discussed previously, the values of SDP can be measured and subsequent information about the mirror(s) derived either during the normal processing cycle of wafers and/or during periods other than a normal processing cycle of wafers and/or prior to installation of the stage mirrors in a lithography tool.

In embodiments, various error compensation techniques can be used to reduce other sources of error in the measurements. For example, cyclic errors that are present in the linear displacement measurements can be reduced (e.g., eliminated) and/or compensated by use of one of more techniques such as described in commonly owned U.S. patent application Ser. No. 10/097,365, entitled "CYCLIC ERROR REDUCTION IN AVERAGE INTERFEROMETRIC MEASUREMENTS," and U.S. patent application Ser. No. 10/616,504 entitled "CYCLIC ERROR COMPENSATION IN INTERFEROMETRY SYSTEMS," which claims priority to Provisional Patent Application No. 60/394,418 entitled "ELECTRONIC CYCLIC ERROR COMPENSATION FOR LOW SLEW RATES," all of which are by Henry A. Hill and the contents of which are incorporated herein in their entirety by reference.

An example of another cyclic error compensation technique is described in commonly owned U.S. patent application Ser. No. 10/287,898 entitled "INTERFEROMETRIC CYCLIC ERROR COMPENSATION," which claims priority to Provisional Patent Application No. 60/337,478 entitled "CYCLIC ERROR COMPENSATION AND RESOLUTION ENHANCEMENT," by Henry A. Hill, the contents of which are incorporated herein in their entirety by reference.

Another example of a cyclic error compensation technique is described in U.S. patent application Ser. No. 10/174,149 entitled "INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS," which claims priority to Provisional Patent Application 60/303,299 entitled "INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS," both by Henry A. Hill and Peter de Groot, the contents both of which are incorporated herein in their entirety by reference.

A further example of a cyclic error compensation technique is described in commonly owned Provisional Patent Application No. 60/314,490 filed entitled "TILTED INTERFEROMETER," by Henry A. Hill, the contents of which is herein incorporated in their entirety by reference.

Other techniques for cyclic error compensation include those described in U.S. Pat. No. 6,137,574 entitled "SYSTEMS AND METHODS FOR CHARACTERIZING AND CORRECTING CYCLIC ERRORS IN DISTANCE MEASURING AND DISPERSION INTERFEROMETRY;" U.S. Pat. No. 6,252,668 B1, entitled "SYSTEMS AND METHODS FOR QUANTIFYING NON-LINEARITIES IN INTERFEROMETRY SYSTEMS;" and U.S. Pat. No. 6,246,481, entitled "SYSTEMS AND METHODS FOR QUANTIFYING NONLINEARITIES IN INTERFEROMETRY SYSTEMS," wherein all three are by Henry A. Hill, the contents of the three above-cited patents and patent applications are herein incorporated in their entirety by reference.

Improved statistical accuracy in measured values of SDP can be obtained by taking advantage of the relatively low bandwidth of measured values of SDP compared to the bandwidth of the corresponding linear displacement measurements using averaging or low pass filtering. The relatively low bandwidth arises because of SDP invariance with respect to displacements of the mirror along the measurement axes and it invariance (at least to second order) on rotations of the mirror. Variations in SDP occur primarily as a result of variations of the mirror surface figure as the mirror is scanned orthogonally to the measurement axes, which depends on the mirror scan speed, but generally occurs at much lower rates than the sampling rates of the detectors used in the 3 axis/plane interferometer. For example, where $b_2 \approx 20$ mm and the stage is scanned at a rate of 0.5 m/s, the bandwidth of measured values of SDP will be of the order of 25 Hz compared to typical sampling rates of the respective detectors of the order of 10 MHz.

The effects of offset errors in the measured values of SDP can be measured by use of an artifact wafer and the artifact wafer rotated by 180 degrees and the offset error effects compensated. Offset errors arise in SDP because SDP is derived from three different interferometer measurements where each of the three interferometers can only measure relative changes in a respective reference and measurement beam paths. In addition, the offset errors may change with time because the calibrations of each of the three interferometers may change with respect to each other, e.g. due to changes in temperature. An artifact wafer is a wafer that includes several alignment marks that are precisely spaced with respect to each other. Accordingly, a metrology system can be calibrated by locating the marks with the system's alignment sensor and comparing the displacement between each alignment mark as measured using the metrology system with the known displacement. In order to measure the effects of offset errors, the angle between the x-axis and y-axis stage mirrors can be measured in one or more planes according to whether interferometer system 10 comprises one or two 3 axis/plane interferometers by use of an artifact wafer and the artifact wafer rotated by 90 degrees.

While the foregoing description is with regard to a particular interferometer assembly, namely interferometer 100, in general, other assemblies can also be used to obtain values for SDP and other parameters. For example, in some embodiments, an interferometer assembly can be configured to monitor the position of a measurement object along more than three coplanar axes (e.g., four or more axes, five or more axes). Moreover, while interferometer includes non-coplanar measurement axes, other embodiments can include exclusively coplanar axes. Furthermore, the relative position of the common measurement beam path is not limited to the position in interferometer 100. For example, in some embodiments, the common measurement beam path can be an outermost path, instead of being flanked by beam paths on either side within the common plane. In certain embodiments, individual, rather than compound, optical components can be used. For example, free-standing beam splitters can be used to divide the first path measurement beam into the other measurement beams. Such a configuration may allow one to adjust the relative spacing of the beams, and hence the relative spacing of the measurement axes in a multi-axis interferometer.

As discussed previously, lithography tools are especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see, for example, the *Semiconductor Industry Roadmap*, p. 82 (1997).

Overlay depends directly on the performance, i.e., accuracy and precision, of the distance measuring interferometers used to position the wafer and reticle (or mask) stages. Since a lithography tool may produce $50-100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photochemical processes in the resist that convert the radiation pattern into a latent image within the resist.

Interferometry metrology systems, such as those discussed previously, are important components of the positioning mechanisms that control the position of the wafer and reticle, and register the reticle image on the wafer. If such interferometry systems include the features described above, the accuracy of distances measured by the systems can be increased and/or maintained over longer periods without offline maintenance, resulting in higher throughput due to increased yields and less tool downtime.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 3:
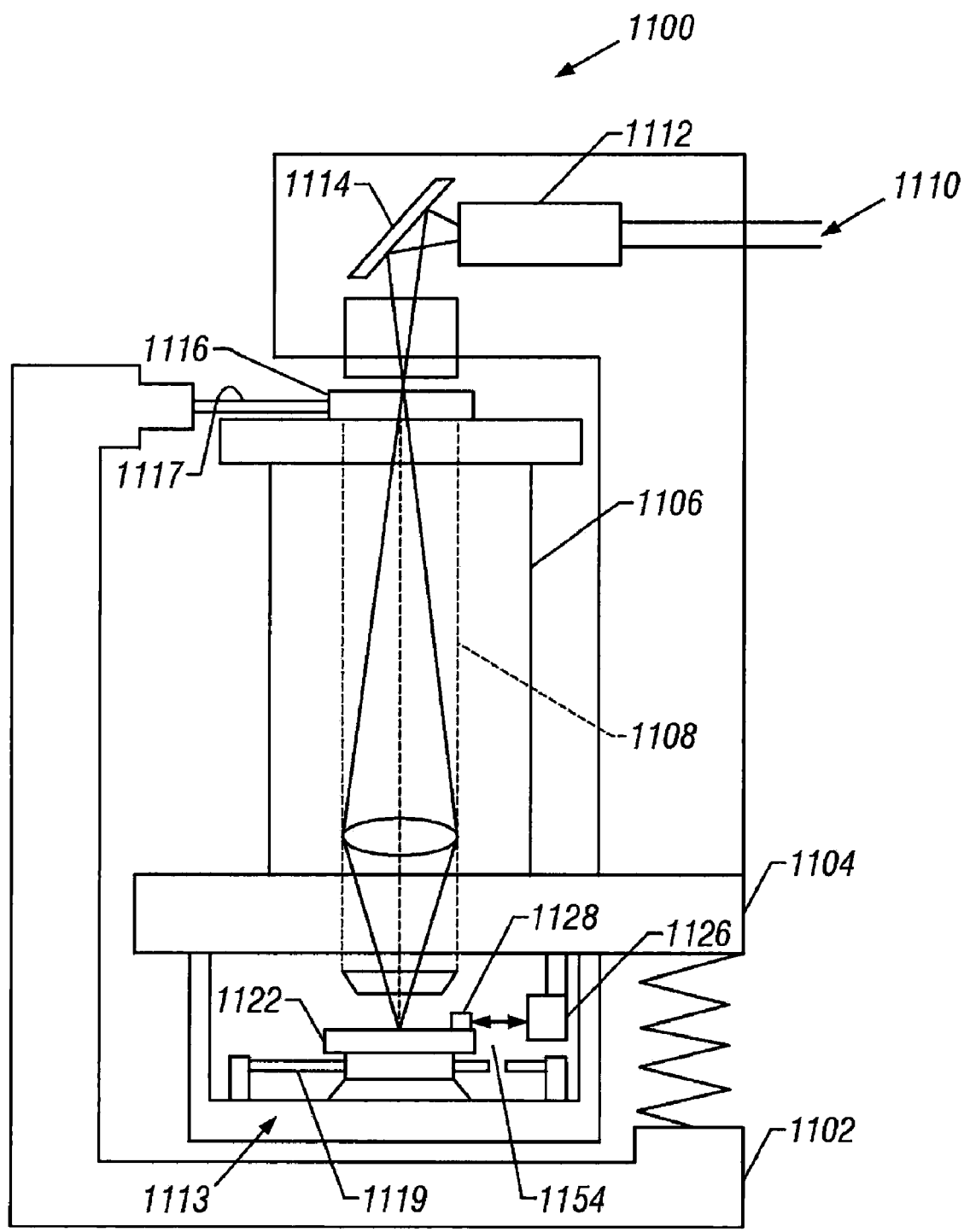
FIG. 3 is a schematic diagram of an embodiment of a lithography tool that includes an interferometer.

Another example of a lithography tool 1100 using an interferometry system 1126 is shown in FIG. 3. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element

1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 4A:
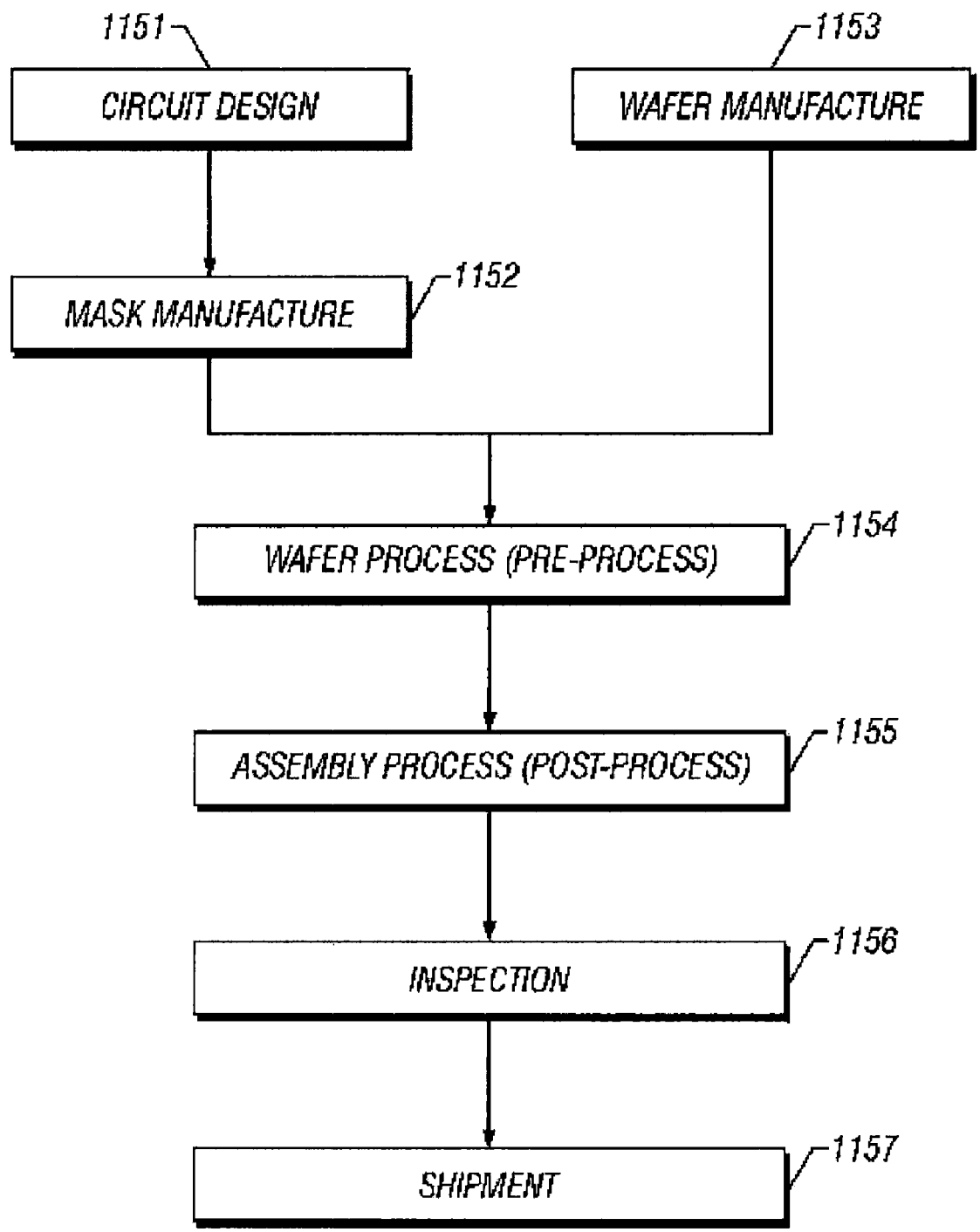
FIG. 4a and FIG. 4b are flow charts that describe steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 4a and 4b. FIG. 4a is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 4B:
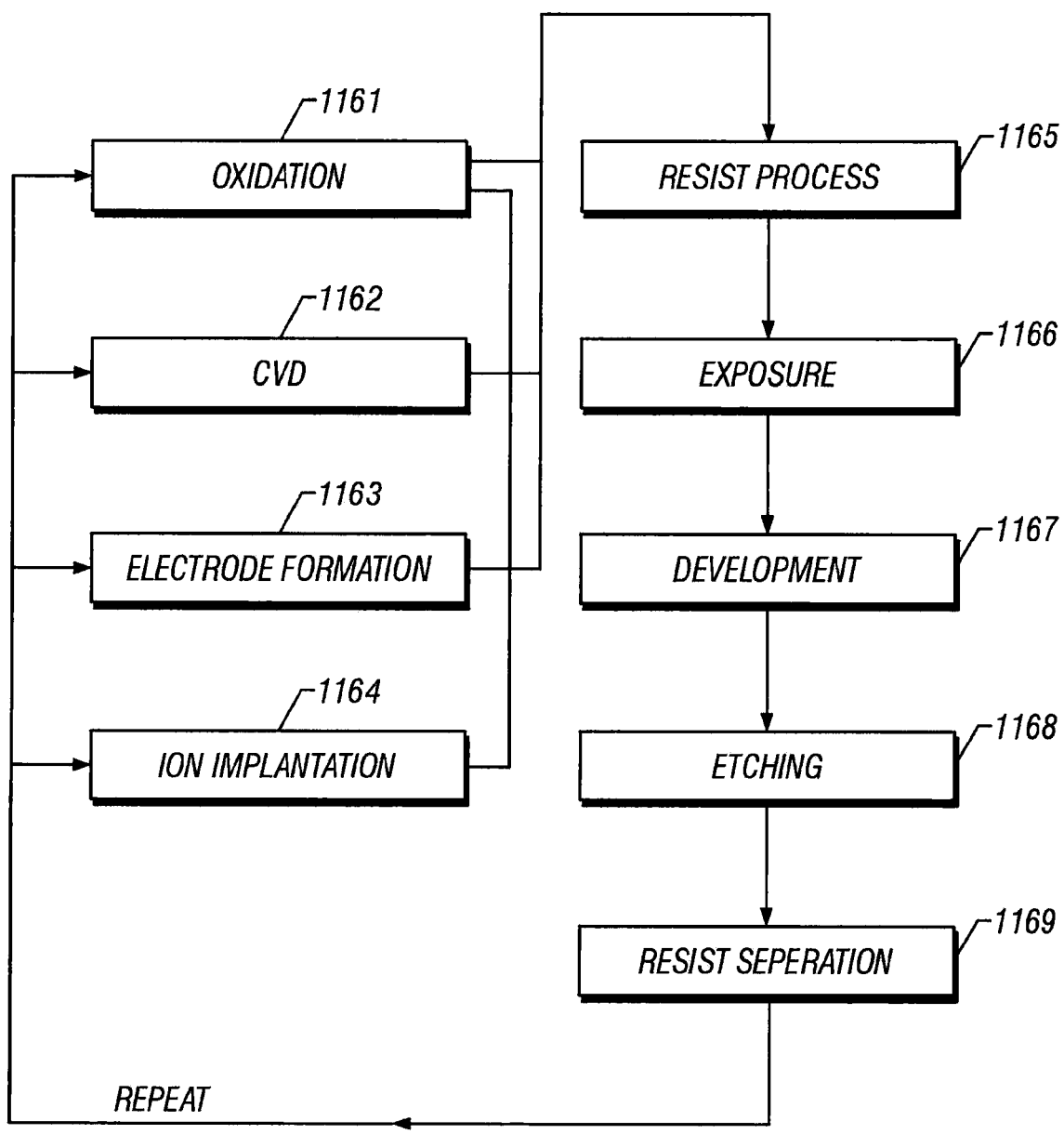

FIG. 4b is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 5:
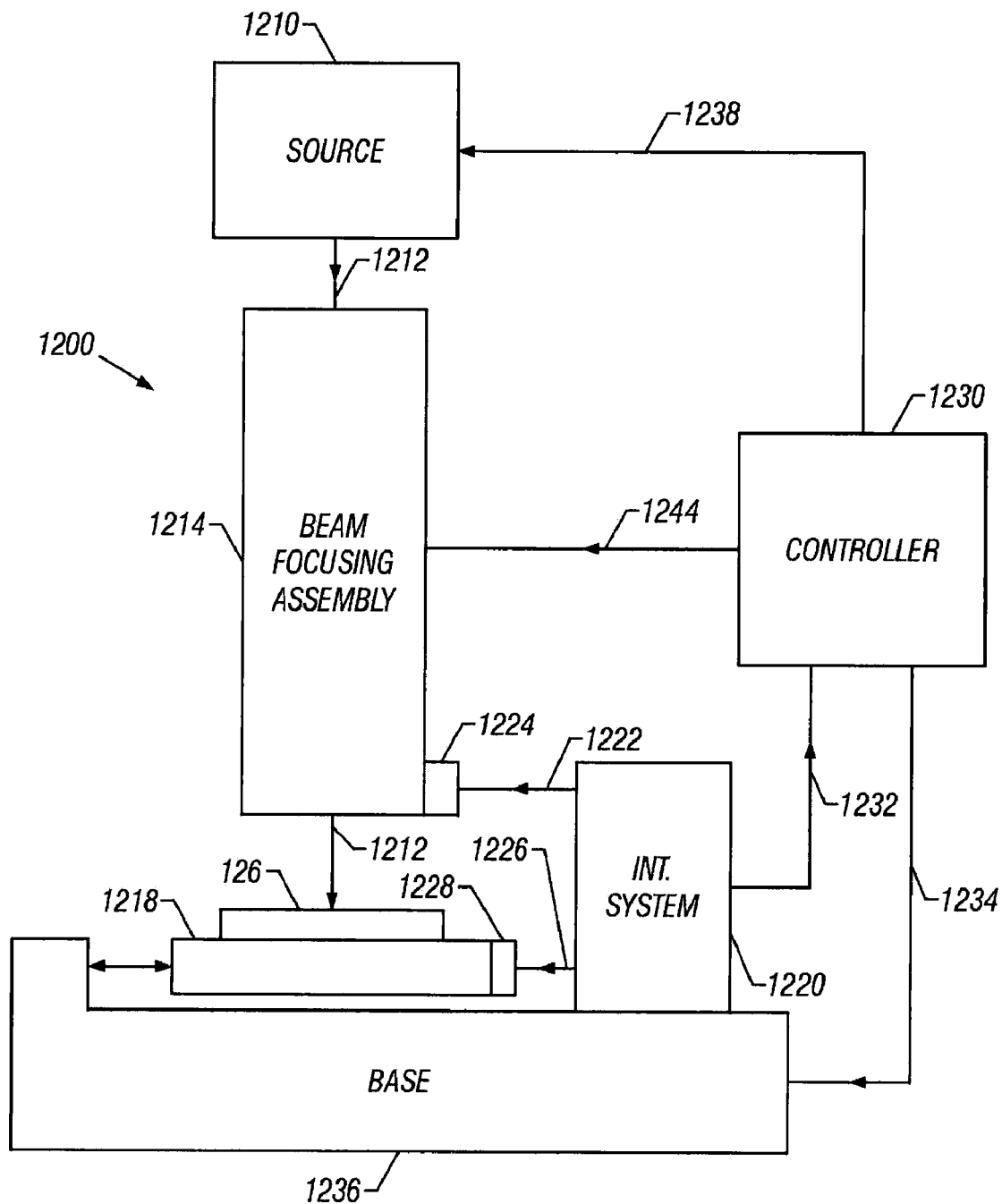
FIG. 5 is a schematic of a beam writing system that includes an interferometry system.

As an example, a schematic of a beam writing system 1200 is shown in FIG. 5. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. A lithography system for use in fabricating integrated circuits on a substrate, the system comprising:
   a stage for supporting the substrate;
   an illumination system including a radiation source, a mask, a positioning system, a lens assembly;
   a positioning system configured to adjust the position of the stage relative to the lens assembly; and
   an interferometer configured to produce at least three output beams each including interferometric information about a distance between the interferometer and a measurement object along a corresponding measurement axis,
   wherein at least one of the interferometer and the measurement object are attached to the stage, and the output beams each include a component that makes a pass to the measurement object along a common beam path.

2. The lithography system of claim 1, wherein the interferometer is configured to provide information about a position of the substrate within the lithography system.

3. The lithography system of claim 1, wherein the interferometer is attached to a rigid frame of the lithography system and the measurement object is attached to the stage.

4. The lithography system of claim 1, wherein at least three of the measurement axes lie in a common plane.

5. The lithography system of claim 4, wherein the at least three measurement axes are parallel.

6. The lithography system of claim 1, further comprising an electronic processing system coupled to the interferometer, wherein the electronic processing system is configured to calculate a value for a second difference parameter (SDP) for the measurement object based on distance between the interferometer and the measurement object along the three measurement axes.

7. The lithography system of claim 6, wherein the SDP is given by the expression $(x_2-x_1)-\eta(x_3-x_2)$, where $x_i$ corresponds to the distance between the interferometry system and the measurement object for the $i^{th}$ measurement axis and $\eta$ is a non-zero constant.

8. The lithography system of claim 7, wherein $\eta$ is selected so that the value for the expression is not sensitive to rotation of the measurement object about an axis orthogonal to the common plane.

9. The lithography system of claim 6, wherein the electronic processor is configured to calculate a value for the SDP for each of multiple positions of the measurement object relative to the interferometer along an axis orthogonal to the measurement axes and determine information about a surface figure for the measurement object based on the multiple values.

10. The lithography system of claim 9, wherein the electronic processor is configured to monitor a position of the measurement object based on at least some of the interferometric information from the three output beams.

11. The lithography system of claim 10, wherein the electronic processor is further configured to use the information about the surface figure to improve the accuracy the monitored position.

12. The lithography system of claim 1, wherein the interferometer is further configured to produce one or more additional output beams each including interferometric information about a distance between the interferometer and the measurement object along a corresponding measurement axis, wherein the measurement axes corresponding to the additional output beams are not coplanar with the at least three measurement axes.

13. The lithography system of claim 12, wherein the measurement axes corresponding to the additional output beams are parallel to the at least three measurement axes.

14. The lithography system of claim 1, wherein the interferometer is configured to direct at least three beams to contact the measurement object at least once and combine each beam with another beam to produce the output beams.

15. The lithography system of claim 1, further comprising an electronic processor that derives information about the surface profile of the measurement object from the output beams as the measurement object is scanned relative to the interferometer along a distance nonparallel to the measurement axes.

16. The lithography system of claim 15, wherein distance over which the measurement object is scanned is orthogonal to the measurement axes.

17. A lithography system for use in fabricating integrated circuits on a substrate, the system comprising:
   a stage for supporting the substrate;
   an illumination system including a radiation source, a mask, a positioning system, a lens assembly;
   a positioning system configured to adjust the position of the stage relative to the lens assembly; and
   an interferometer configured to produce at least three output beams each including interferometric information about a distance between the interferometer and a measurement object along a corresponding measurement axis, wherein at least one of the interferometer and the measurement object are attached to the stage; and
   an electronic processing system coupled to the interferometer, wherein the electronic processing system is configured to calculate a value for a second difference parameter (SDP) for the measurement object based on the distances between the interferometer and the measurement object along the at least three measurement axes.

18. The lithography system of claim 17, wherein the SDP is given by the expression $(x_2-x_1)-\eta(x_3-x_2)$, where $x_i$ corresponds to the distance between the interferometry system and the measurement object for the $i^{th}$ measurement axis and $\eta$ is a non-zero constant.

19. A lithography system for use in fabricating integrated circuits on a substrate, the system comprising:
   a stage for supporting the substrate;
   an illumination system including a radiation source, a mask, a positioning system, a lens assembly;
   a positioning system configured to adjust the position of the stage relative to the lens assembly; and an interferometer configured to produce at least three output beams each including interferometric information about a distance between the interferometer and a measurement object along a corresponding measurement axis, wherein at least one of the interferometer and the measurement object are attached to the stage and the output beams each include a component that makes one pass to the measurement object along a common measurement beam path; and an electronic processor configured to derive information about the surface figure profile of the measurement object from the output beams as the measurement object is scanned relative to the interferometry system along a distance non-parallel to the measurement axes.

20. The lithography system of claim 19, wherein distance over which the measurement object is scanned is orthogonal to the measurement axes.

21. The lithography system of claim 19, wherein the electronic processor is configured to monitor a position of the measurement object based on at least some of the interferometric information from the three output beams while the lithography system illuminates a substrate with imaged radiation.

22. The lithography system of claim 21, wherein the electronic processor is further configured to use the information about the surface figure profile to improve the accuracy of the monitored position.

23. A lithography method for use in fabricating integrated circuits on a substrate, the method comprising:

supporting the substrate on a moveable stage;
imaging spatially patterned radiation onto the substrate;
adjusting the position of the stage;
producing at least three output beams each including interferometric information about a distance between an interferometer and a measurement object along a corresponding measurement axis, wherein at least one of the interferometer and the measurement object are attached to the stage and the output beams each include a component that makes a pass to the measurement object along a common beam path; and monitoring the position of the stage based on the interferometric information from at least one of the output beams.

24. The lithography method of claim 23, further comprising deriving information about the surface figure profile of the measurement object from the output beams as the measurement object is scanned relative to the interferometry system along a distance non-parallel to the measurement axes.

25. The lithography method of claim 24, further comprising using the information about the surface figure profile of the measurement object to improve the accuracy of the monitored position.

26. A method for fabricating integrated circuits, the method comprising the lithography method of claim 23.

27. A lithography method for fabricating integrated circuits on a substrate comprising:

positioning a first component of a lithography system relative to a second component of a lithography system to expose the substrate to spatially patterned radiation;

producing at least three output beams each including interferometric information about a distance between an interferometer and a measurement object along a corresponding measurement axis, wherein at least one of the interferometer and the measurement object are attached to the first component and the output beams each include a beam component that makes a pass to the measurement object along a common beam path; and monitoring the position of the stage based on the interferometric information from at least one of the output beams.

28. The lithography method of claim 27, further comprising calculating values of a second difference parameter (SDP) for the measurement object based on the distances between the interferometer and the measurement object along the at least three measurement axes; and deriving information about a surface figure profile of the measurement object from calculated values of the SDP.

29. A method for fabricating integrated circuits, the method comprising the lithography method of claim 27.

* * * * *